United States Patent
Goldberg et al.

(10) Patent No.: US 10,260,546 B2
(45) Date of Patent: Apr. 16, 2019

(54) INSERT NUT AND FASTENING SYSTEM WITH INTEGRAL SEAL AND BUMPER

(71) Applicant: FORD GLOBAL TECHNOLOGIES, LLC, Dearborn, MI (US)

(72) Inventors: Ira Jason Goldberg, Ann Arbor, MI (US); Shibu Koyadan Chathoth, Clawson, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 106 days.

(21) Appl. No.: 15/203,971

(22) Filed: Jul. 7, 2016

(65) Prior Publication Data
US 2018/0010625 A1    Jan. 11, 2018

(51) Int. Cl.
| F16B 37/04 | (2006.01) |
| F16B 13/08 | (2006.01) |
| B60R 19/50 | (2006.01) |
| F16B 33/00 | (2006.01) |

(52) U.S. Cl.
CPC .............. *F16B 13/08* (2013.01); *B60R 19/50* (2013.01); *F16B 33/004* (2013.01); *F16B 37/043* (2013.01)

(58) Field of Classification Search
CPC .................................................. F16B 2013/08
USPC ........................................................ 411/182
See application file for complete search history.

(56) References Cited

U.S. PATENT DOCUMENTS

| 2,534,797 | A | * | 12/1950 | Rugh | ..................... | H01H 51/08 |
| | | | | | | 335/126 |
| 3,534,797 | A | * | 10/1970 | Haug | .................... | F16B 5/0258 |
| | | | | | | 411/108 |
| 5,573,362 | A | * | 11/1996 | Asami | .................. | F16B 21/086 |
| | | | | | | 411/182 |
| 5,636,953 | A | * | 6/1997 | Jaeger | ................... | F16B 33/004 |
| | | | | | | 411/258 |
| 6,315,510 | B1 | * | 11/2001 | Sturies | .................... | F16B 13/00 |
| | | | | | | 411/182 |
| 6,443,678 | B2 | * | 9/2002 | Mizuno | ................. | F16B 5/0258 |
| | | | | | | 411/182 |
| 6,572,317 | B2 | * | 6/2003 | Okada | .................... | F16B 5/0657 |
| | | | | | | 24/297 |
| 7,549,829 | B2 | * | 6/2009 | Okada | ..................... | F16B 5/065 |
| | | | | | | 24/453 |
| 7,927,050 | B2 | * | 4/2011 | Koike | .................. | F16B 5/0628 |
| | | | | | | 411/104 |

(Continued)

FOREIGN PATENT DOCUMENTS

| CN | 2426648 Y | 4/2001 |
| CN | 201358989 Y | 12/2009 |

(Continued)

OTHER PUBLICATIONS

English Machines Translation of CN201358989Y.

(Continued)

*Primary Examiner* — Gary W Estremsky
(74) *Attorney, Agent, or Firm* — Jason Rogers; Vichit Chea; King & Schickli, PLLC

(57) ABSTRACT

An insert nut includes a body having an opening at a first end, an end wall at a second end and an internal cavity extending between the opening and the end wall. A seal is carried on the body around the opening. In addition, a fastening system is provided. That fastening system includes the insert nut and a cooperating fastener.

8 Claims, 5 Drawing Sheets

(56) References Cited

U.S. PATENT DOCUMENTS

| | | | | |
|---|---|---|---|---|
| 8,333,540 B2* | 12/2012 | Nakazato | ............ | F16B 21/086 24/297 |
| 8,939,690 B2* | 1/2015 | Kuhm | ................ | F16B 41/002 411/182 |
| 9,011,061 B2* | 4/2015 | Hofmann | ............ | F16B 37/043 411/182 |
| 2008/0038078 A1* | 2/2008 | Ciulis | ................ | F16B 13/045 411/34 |

FOREIGN PATENT DOCUMENTS

| | | |
|---|---|---|
| CN | 201827190 U | 5/2011 |
| CN | 202056165 U | 11/2011 |
| CN | 202294603 U | 7/2012 |
| CN | 202669621 U | 1/2013 |
| CN | 202811760 U | 3/2013 |
| CN | 202827295 U | 3/2013 |
| CN | 203067496 U | 7/2013 |
| CN | 203477010 U | 3/2014 |

OTHER PUBLICATIONS

English Machine Translation of CN201827190U.
English Machine Translation of CN202056165U.
English Machine Translation of CN202294603U.
English Machine Translation of CN202669621U.
English Machine Translation of CN202811760U.
English Machine Translation of CN202827295U.
English Machine Translation of CN203067496U.
English Machine Translation of CN203477010U.
English Machine Translation of CN2426648Y.

* cited by examiner

INSERT NUT AND FASTENING SYSTEM WITH INTEGRAL SEAL AND BUMPER

TECHNICAL FIELD

This document relates generally to the fastener field and, more particularly, to an insert nut and fastening system that incorporate an integral seal and bumper. Such a system is useful for many purposes including securing a license plate to a body panel of a motor vehicle.

BACKGROUND

Countries around the world require a license plate to be fastened to a motor vehicle in order to readily identify a particular motor vehicle. In many applications, the license plate is secured to a body panel by means of two or more insert nuts anchored in cooperating apertures in the body panel and two or more cooperating fasteners that pass through apertures in the license plate and are secured in the insert nuts.

In order to prevent (1) the license plate from rattling against the sheet metal or plastic body panel and (2) water and/or other debris from leaking into the motor vehicle through the holes in the body panel, separate foam washers or bumpers are secured by means of the fasteners between the license plate and body panel. While these separate resilient foam washers or bumpers are effective for these purposes, they are not without their drawbacks. Since the foam washers or bumpers are separate component parts, they must be accounted for and properly assembled in position. This increases installation complexity and installation time.

This document relates to a new and improved insert nut and fastening system that incorporate an integral seal and bumper. By incorporating an integral seal and bumper, the insert nut and fastening system avoid the need to account for a separate seal, simplifying assembly times and reducing assembly costs.

SUMMARY

In accordance with the purposes and benefits described herein, an insert nut is provided. That insert nut comprises a body including an opening at a first end, an end wall at a second end and an internal cavity extending between the opening and the end wall. The insert nut also includes a seal carried on the body around the opening. That seal is integral with the body.

This seal may include a first sealing feature and a second sealing feature. The first sealing feature and the second sealing feature may be oriented in opposed directions. Further, the first sealing feature may open toward the end wall while the second sealing feature projects outwardly from the body and away from the end wall. In some embodiments, the second sealing feature may comprise a bumper that extends continuously around the opening.

The body may include a flange adjacent the opening. The seal may include a channel and the flange may be received in the channel. In some embodiments the seal may be overmolded onto the body so that the channel is formed around the flange to lock the seal and body together and form a single integral structure.

The insert nut may further include a plurality of resilient retention wings that project from the body. Further, the body may be polygonal in cross section while the internal cavity is circular in cross section. In some embodiments the body is square in cross section and the internal cavity is cylindrical in shape.

In accordance with yet another aspect, a fastening system is provided. That fastening system comprises the insert nut, as described herein, and a fastener received and secured in the internal cavity of the insert nut.

Accordingly, the seal of the insert nut may include a first sealing feature and a second sealing feature. That first sealing feature may comprise a pair of sealing lips defining a groove therebetween and the second sealing feature may comprise a bumper.

The bumper may project outwardly from the body of the insert nut and away from the end wall. The bumper may also extend continuously around the opening at the end of the insert nut that communicates with the internal cavity in the body of the insert nut.

The body may also include a flange adjacent the opening and the seal may include a channel. The flange may be received in the channel. Further, the body of the insert nut may include a plurality of resilient retention wings that project from the body. That body may be polygonal in cross section while the internal cavity within the insert nut may be cylindrical in shape.

In the following description, there are shown and described several preferred embodiments of the insert nut and the fastening system. As it should be realized, the insert nut and the fastening system are capable of other, different embodiments and their several details are capable of modification in various, obvious aspects all without departing from the insert nut and fastening system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the insert nut and the fastening system and together with the description serve to explain certain principles thereof. In the drawing figures.

Reference will now be made in detail to the present preferred embodiments of the insert nut and the fastening system, examples of which are illustrated in the accompanying drawing figures.

DETAILED DESCRIPTION

Figure 1:
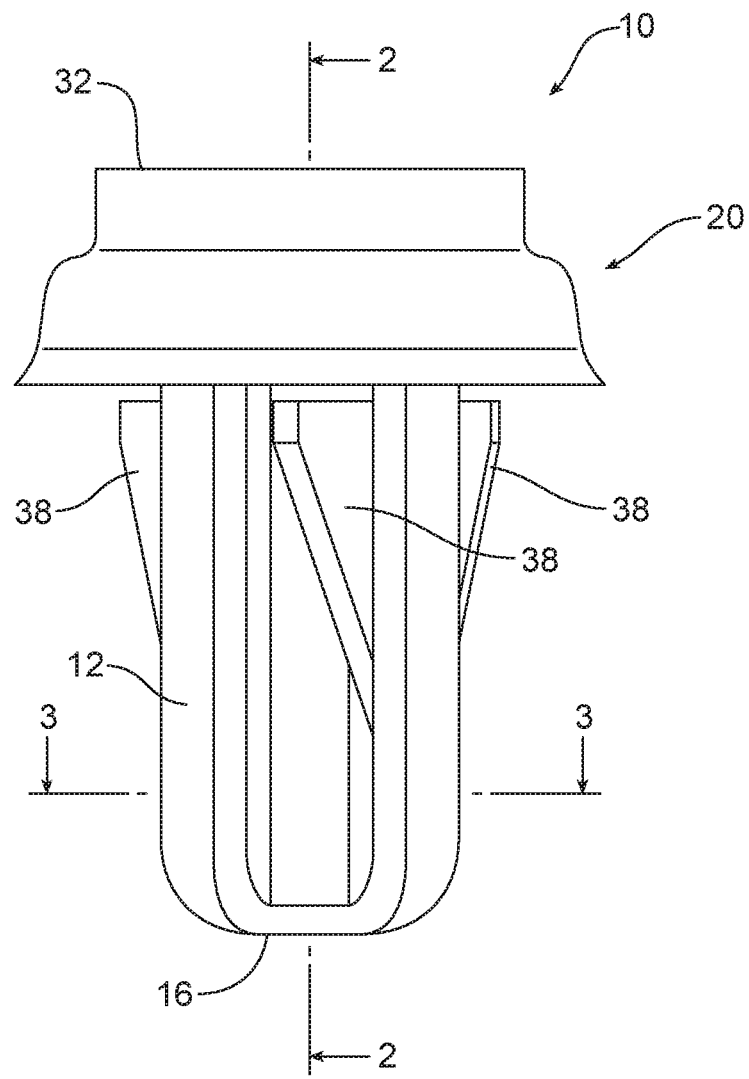
FIG. 1 is a side elevational view of the insert nut.
Figure 2:
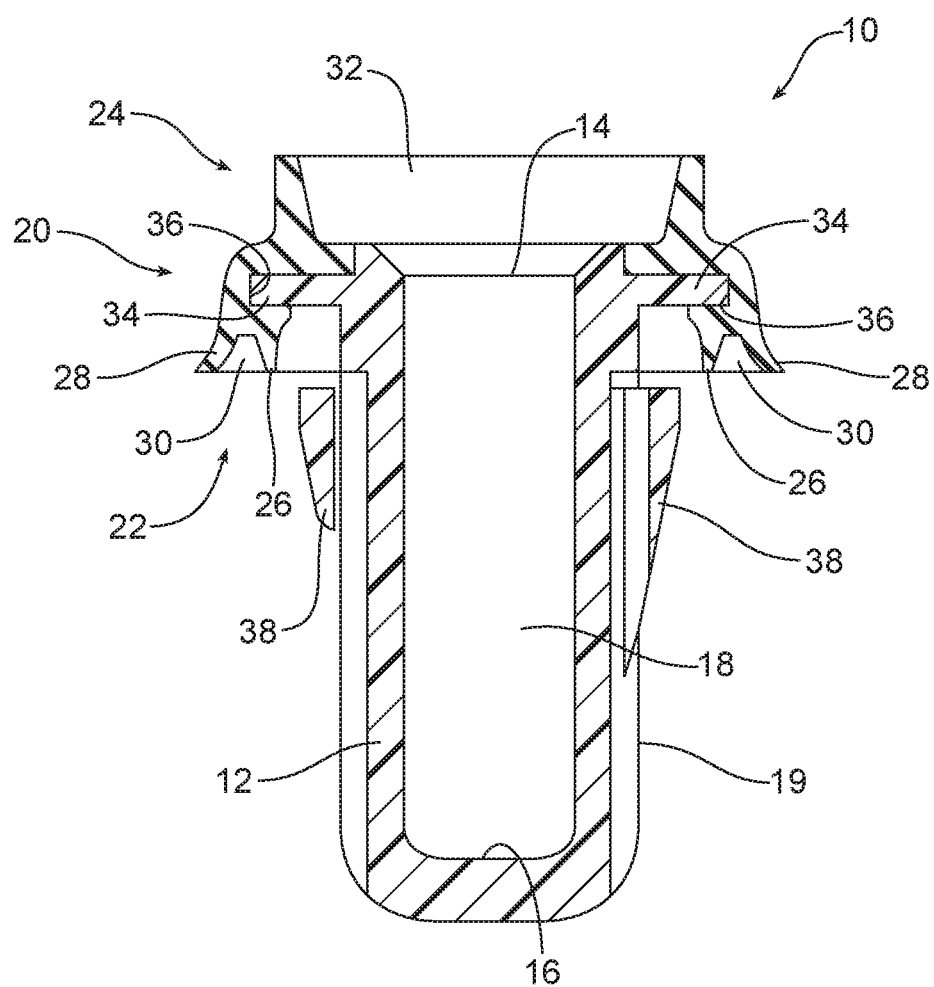
FIG. 2 is a longitudinal cross-sectional view of the insert nut taken along line 2-2 of FIG. 1.
Figure 3:
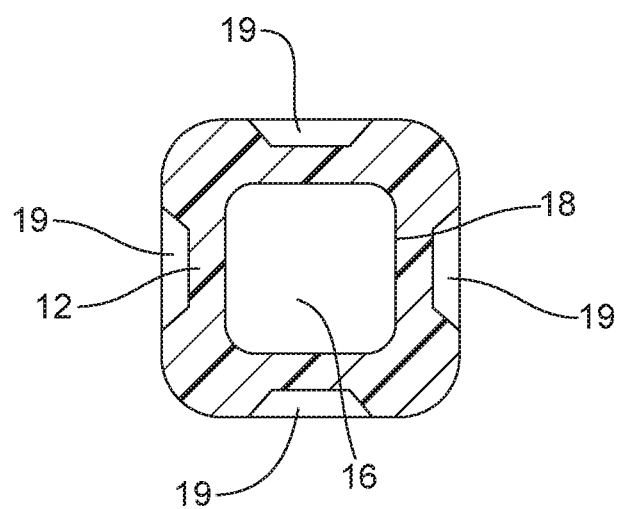
FIG. 3 is a transverse cross-sectional view of the insert nut taken along line 3-3 of FIG. 1.

Reference is now made to FIGS. 1-3 illustrating the insert nut 10. The insert nut 10 comprises a body 12 that may be molded from a plastic or composite material. The body 12 includes an opening 14 at a first end and an end wall 16 at a second end. An internal cavity 18 extends between the opening 14 and the end wall 16. In some embodiments, the body 12 has an outer surface 19 that is polygonal in cross section while the internal cavity 18 is circular in cross section. In the illustrated embodiment, the body 12 is substantially square in cross section while the internal cavity 18 is cylindrical in shape.

As further illustrated in FIGS. 1-3, the insert nut 10 includes a seal, generally designated by reference numeral 20. The seal 20 is carried on the body 12 at the first end thereof around the opening 14. The seal 20 includes a first sealing feature, generally designated by reference numeral 22, and a second sealing feature, generally designated by reference numeral 24. As illustrated, the first sealing feature 22 and the second sealing feature 24 are oriented in opposed directions. More specifically, in the illustrated embodiment the first sealing feature 22 comprises a pair of adjacent sealing lips 26, 28. More specifically, the sealing lip 26 is concentrically arranged within the sealing lip 28 so that the two sealing lips define a groove 30 therebetween. As best illustrated in FIG. 2, the first sealing feature 22, including the sealing lips 26, 28 and the groove 30, open toward the end wall 16 at the second end of the body 12.

The second sealing feature 24 comprises a resilient bumper 32 that projects outwardly from the body 12 away from the end wall 16. The resilient bumper 32 also extends continuously around the opening 14.

As best illustrated in FIG. 2, the body 12 includes a flange 34 around the first end thereof adjacent the opening 14. The seal 20 includes a channel 36. Both the flange 34 and the channel 36 are continuous. The seal 20 is secured to the body 12 by means of the flange 34 being received and held in the channel 36. In one particularly useful embodiment, the seal 20 is overmolded onto the body 12 so that the channel 36 is formed directly around the flange 34 to lock the seal 20 on the body 12 thereby forming an insert nut 10 incorporating an integral body and seal.

As further illustrated in FIGS. 1 and 2, the body 12 also includes a plurality of resilient retention wings 38 that project outwardly from the body 12 and serve to retain the insert nut 10 in position in a manner that will be described in greater detail below.

Figure 4:
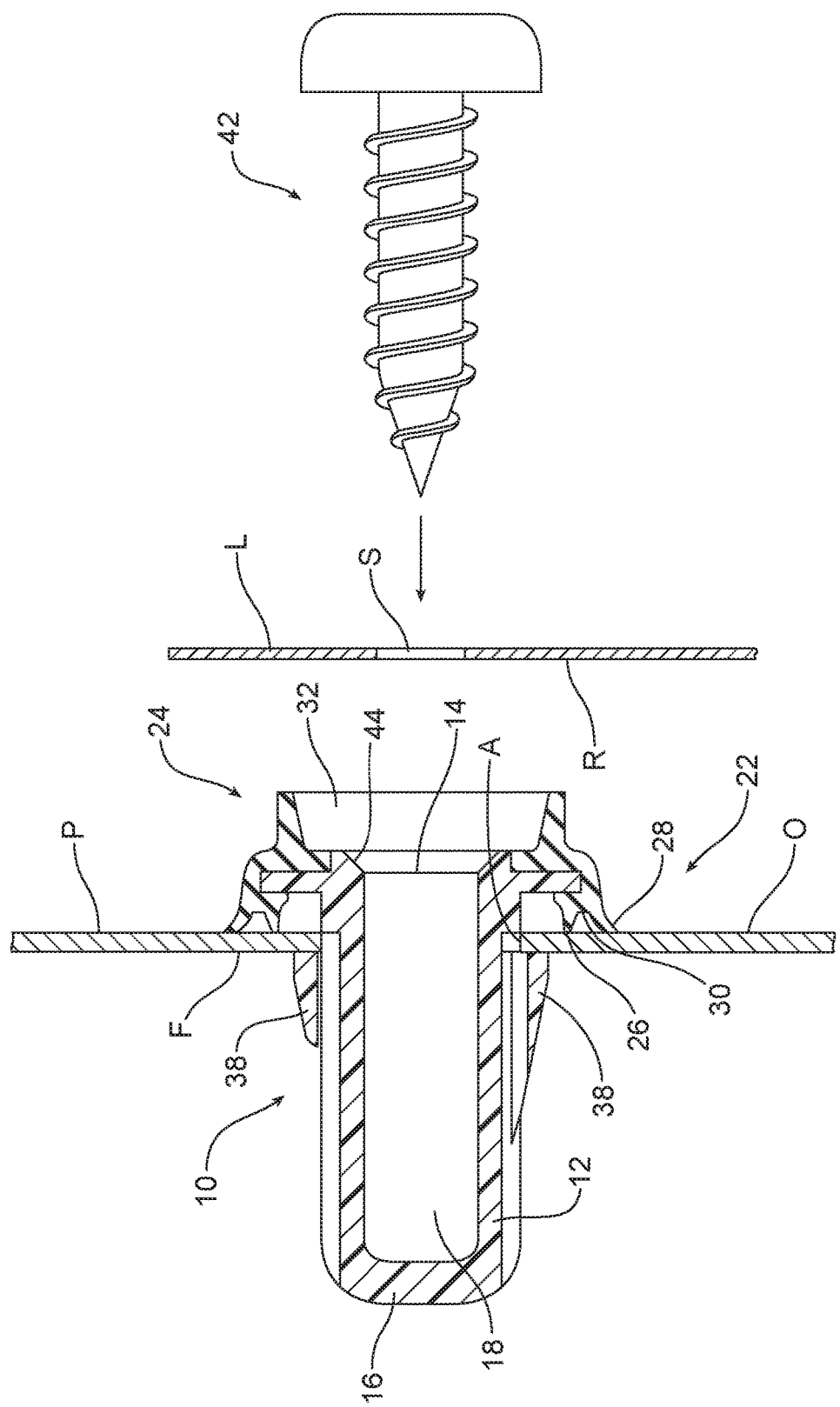
FIG. 4 is a cross-sectional view illustrating the fastening system including the insert nut illustrated in FIGS. 1-3 and a fastener that is received and secured in an internal cavity of the insert nut. As illustrated, the fastening system is used for securing a license plate to a body panel of a motor vehicle.

Reference is now made to FIG. 4 illustrating the fastening system 40. That fastening system comprises a fastener 42, such as the illustrated screw fastener, and the insert nut 10 that is described in detail above and illustrated in FIGS. 1-3.

Figure 5:
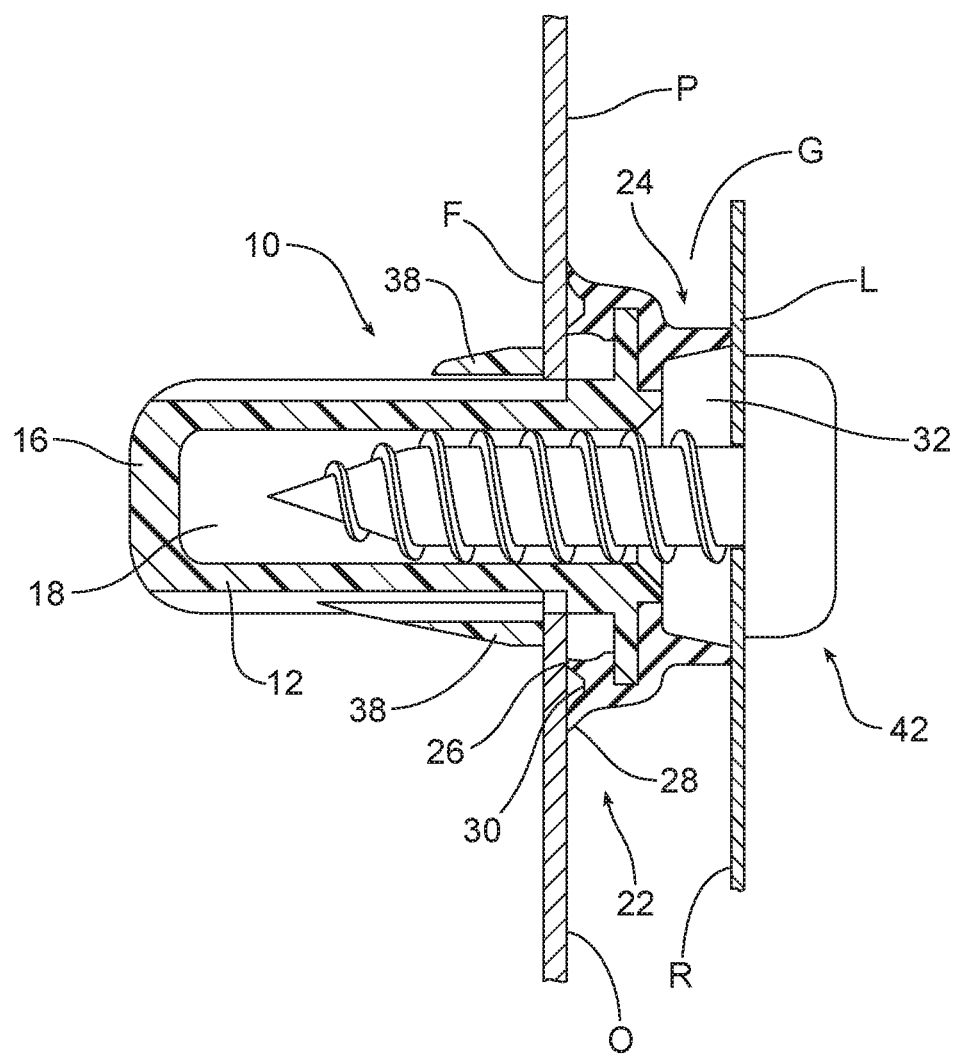
FIG. 5 is a view similar to FIG. 4 but showing a license plate seated on the bumper of the insert nut seal.

One may use the fastening system 40 to secure a license plate L to a body panel P of a motor vehicle. More specifically, as illustrated in FIGS. 4 and 5, the insert nut 10 is fully inserted and seated in an aperture A of the body panel P. As the insert nut 10 is inserted into the aperture A, the resilient retention wings 38 collapse against the body 12 so as to pass through the aperture A. Once the insert nut 10 is fully inserted in the aperture A of the body panel P, the resilient retention wings 38 spring back into a home position projecting outwardly from the body 12 so that they engage the inner face F of the body panel P and thereby function to retain the insert nut 10 in the aperture A.

As should be further appreciated, the first sealing feature 22 provides an effective seal against the outer face O of the body panel P. More specifically, the cooperating sealing lips 26, 28 are pressed against the outer face O so as to provide a water tight seal around the aperture A. Here it should also be appreciated that the end wall 16 closes the internal cavity 18 in the body 12 of the insert nut 10. Together, the closed or blind internal cavity 18 and the first sealing feature 22 prevent water from getting behind the body panel P whether or not a fastener 42 is secured in the insert nut.

One secures the license plate L to the body panel P by aligning the license plate in proper position and extending the fastener 42 through a screw hole opening S in the license plate and tightening that fastener 42 into the internal cavity 18 of the insert nut 10. The tapered margin 44 in the body 12 at the entry of the opening 14 helps guide the fastener 42 into the internal cavity 12. The fastener 42 is tightened in the insert nut 10 in order to complete the connection.

As best illustrated in FIG. 5, once the license plate L is fully seated against the body panel P, the bumper 32 engages and seals against the rear surface R of the license plate. Here it should be appreciated that the second sealing feature 24/bumper 32 seals against moisture penetration but also maintains a space between the license plate L and the body panel P so as to prevent rattling of the license plate against the body panel.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An insert nut, comprising:
   a body including an opening at a first end, a flange adjacent said opening, an end wall at a second end and an internal cavity extending between said opening and said end wall; and
   a seal carried on said body around said opening, wherein said seal includes (a) a first sealing feature, (b) a second sealing feature and (c) a channel, wherein said first sealing feature and said second sealing feature are oriented in opposed directions, said first sealing feature opens toward said end wall, said second sealing feature is a bumper that extends continuously around and projects outwardly from said opening and said flange is received in said channel in a direction away from said end wall.

2. The insert nut of claim 1, wherein said seal is overmolded onto said body.

3. The insert nut of claim 2, further including a plurality of resilient retention wings projecting from said body.

4. The insert nut of claim 3, wherein said body is polygonal in cross section and said internal cavity is circular in cross section.

5. The insert nut of claim 3, wherein said body is square in cross section and said internal cavity is cylindrical.

6. A fastening system, comprising:
   an insert nut having a body including an opening at a first end, a flange adjacent said opening, an end wall at a second end and an internal cavity extending between said opening and said end wall, said insert nut including a seal carried on said body around said opening, wherein said seal includes a channel, a first sealing feature and a second sealing feature, and wherein said flange is received in said channel, said first sealing feature comprises a pair of sealing lips defining a groove therebetween and said second sealing feature comprises a bumper that extends continuously around and projects outwardly from said opening in a direction away from said end wall; and
   a fastener received and secured in said internal cavity.

7. The fastening system of claim 6, further including a plurality of resilient retention wings projecting from said body.

8. The fastening system of claim 7, wherein said body is polygonal in cross section and said internal cavity is cylindrical.

* * * * *